(12) United States Patent
Ganapathy et al.

(10) Patent No.: US 8,966,000 B2
(45) Date of Patent: Feb. 24, 2015

(54) AGGREGATION AND RE-ORDERING OF INPUT/OUTPUT REQUESTS FOR BETTER PERFORMANCE IN REMOTE FILE SYSTEMS

(75) Inventors: Ramanathan Ganapathy, Redmond, WA (US); Thomas J. Ootjers, Kirkland, WA (US); Mathew George, Bellevue, WA (US); David Kruse, Kirkland, WA (US); Jeffrey C. Fuller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1389 days.

(21) Appl. No.: 11/821,395

(22) Filed: Jun. 22, 2007

(65) Prior Publication Data

US 2008/0320155 A1  Dec. 25, 2008

(51) Int. Cl.
G06F 15/173 (2006.01)
G06F 17/30 (2006.01)

(52) U.S. Cl.
CPC .............. *G06F 17/30203* (2013.01)
USPC ........................................ 709/217

(58) Field of Classification Search
USPC ........................................ 709/230
See application file for complete search history.

(56) References Cited

U.S. PATENT DOCUMENTS

| | | | |
|---|---|---|---|
| 5,535,375 A | 7/1996 | Eshel et al. | |
| 6,108,707 A | 8/2000 | Wiese | |
| 6,233,702 B1* | 5/2001 | Horst et al. | 714/48 |
| 6,957,219 B1 | 10/2005 | Lin et al. | |
| 7,191,241 B2 | 3/2007 | Boucher et al. | |
| 7,200,632 B1 | 4/2007 | Greschler et al. | |
| 2001/0005853 A1* | 6/2001 | Parkes et al. | 709/106 |
| 2003/0055915 A1* | 3/2003 | Ngo | 709/219 |
| 2004/0128427 A1* | 7/2004 | Kazar et al. | 711/4 |
| 2006/0068911 A1 | 3/2006 | Pirich et al. | |
| 2006/0077976 A1 | 4/2006 | Park | |
| 2006/0173921 A1* | 8/2006 | Jalonen | 707/200 |
| 2006/0271697 A1 | 11/2006 | Kruse et al. | |
| 2008/0228933 A1* | 9/2008 | Plamondon | 709/230 |

OTHER PUBLICATIONS

Bradley Mitchell, About.com Guide Wireless/Networking, http://compnetworking.about.com.od/networkprotocols/g/mtu-maximum.htm, entire document.*

Sha et al., "NoSQ: Store-Load Communication without a Store Queue," IEEE, 2006, http://delivery.acm.org/10.1145/1200000/1194845/27320285.pdf?key1=1194845&key2=2111947711&coll=GUIDE&dl=GUIDE&CFID=17305825&CFTOKEN=11222851.

"SMB Block Size Negotiation When Copying Files with Windows NT Explorer," Microsoft Corporation, 2007, http://support.microsoft.com/kb/223140/.

"SMBFS mounting," http://publib.boulder.ibm.com/infocenter/pseries/v5r3/index.jsp?topic=/com.ibm.aix.commadmn/doc/commadmndita/smbfs_intro.htm.

* cited by examiner

*Primary Examiner* — Scott Christensen (74) *Attorney, Agent, or Firm* — Henry Gabryjelski; Raghu Chinagudabha; Micky Minhas (57) ABSTRACT

A method and system for managing remote file system requests between client and server redirectors where a set of data request packets may be aggregated and/or ordered at a server based on hint information from a client.

20 Claims, 11 Drawing Sheets

AGGREGATION AND RE-ORDERING OF INPUT/OUTPUT REQUESTS FOR BETTER PERFORMANCE IN REMOTE FILE SYSTEMS

BACKGROUND

Remote file systems enable an application to access files stored on the same or remotely located computer using a pair of redirector components and a communication pathway such as a network. A client side redirector (accessible to an application desiring to write or retrieve a file) partitions a file data request into a set of smaller request packets to accommodate, for example, packet size limitations of the communication network. A server side redirector may be adapted to retrieve the requests over the network and communicate with a local file system to retrieve from or write to a data file.

Existing remote file systems can be inefficient in their handling of requests for retrieving data from a server or writing to the server. In particular, remote file systems may process data access requests received from a client in a random or non-sequential order (e.g., based on a non-contiguous memory address order). This may cause inefficient server disk activity that results in constant zeroing out of data for out-of-order write requests and/or excessive disk seeks for out-of-order read requests. This can tie up the server and increase server response time. In a system or network involving many clients and high data traffic, this inefficient remote file system may cause unacceptable delays in processing data requests.

SUMMARY

A method and system for managing input/output requests of a redirector and a file server component is disclosed that may increase server availability and reduce server response time. The client redirector may be adapted to estimate or determine a file size for a data access request (e.g., a write or read request) and provide a hint or indication to a server redirector regarding the estimated file size. The hint may be sent to the server as a header in a set of packets representing the file access request. The server may then determine, based on the hint, whether to aggregate and/or order a set of request packets corresponding to the file. The server redirector may be adapted to queue a set of network packets based on the hint. The server may further order the queued network packets sequentially based on the hint before transmitting a request to a local file system for filling each request. The server redirector may also be adapted to determine when to aggregate requests received at the server or aggregate data received from the local file system based on existing network traffic conditions and/or memory conditions along with the hint information.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
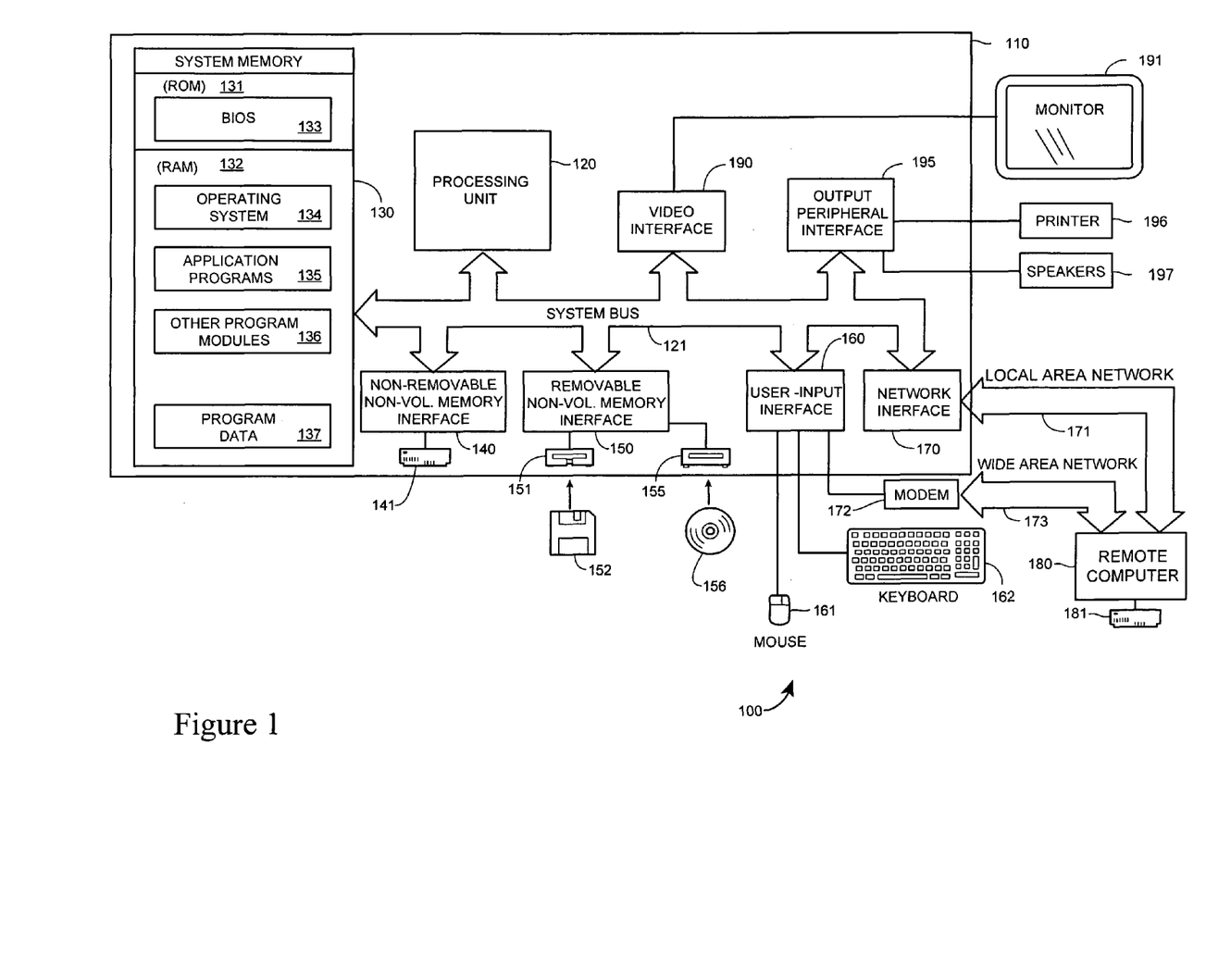
FIG. 1 illustrates a block diagram of a computing system that may operate in accordance with the claims.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Generally, remote file systems may enable an application that runs on a client computer to access files stored on the same or different computer. Remote file systems may make other resources (e.g., remote devices such as files and printers) accessible from a client computer. The remote file and resource access may generally take place using a communication pathway such as a local area network (LAN), wide area network (WAN), point-to-point link, or other communication mechanism. These file systems may be referred to as network file systems or distributed file systems.

Figure 2:
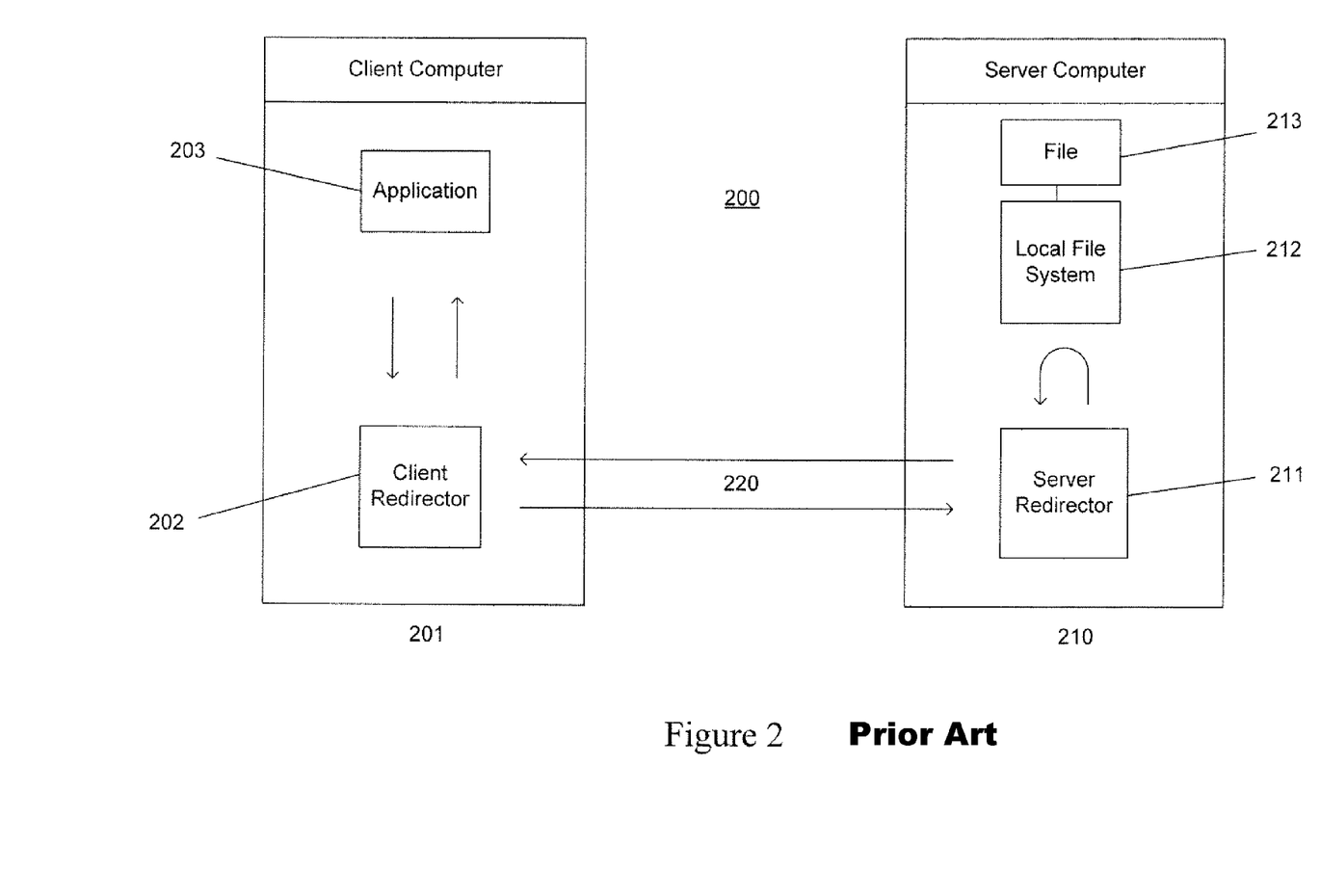
FIG. 2 illustrates a general remote file system and a general I/O request flow in existing remote files systems.

FIG. 2 illustrates the basic elements that may be used to implement a remote file system 200. A client device 201 may include a client redirector 202 that communicates with a client application 203. A server device 210 may include a server redirector 211 that communicates with a local file system 212 to access one or more files 213. A file sharing protocol 220 may be used for communication over a communication pathway between the client 201 and server 210. One example of a remote file system may involve a client network redirector (RDR), a communication protocol such as Common Internet File System (CIFS) or Server Message Block (SMB) protocol; and a server redirector such as an SMB Server.

The client redirector 202 may receive requests from a client application 203 (which may be through an intermediary component such as an I/O Manager) for access to a remote file 213 and send (or redirect) the necessary information over a network using a file sharing protocol 220 to a remote file server 210.

The server 210 may contain a corresponding server redirector 211 for managing calls or requests from the client redirector 201. The server redirector 211 implements the remote file server operations that access a file system 212 or other resources on the server. Requests are received from server redirector 211 that are processed on the file server 210, and the responses are sent back to the client redirector 201. The client redirector 201 receives responses from the server 210 and returns a response to the local application 203. The client redirector 202 creates the appearance on the client system 201 that remote files 213 and other resources are the same as local files and resources and allows them to be used and manipulated in the same manner. A single device or system 201 or 210 may act as both a client and as a server to other clients. It may be common to find both client and server software running on a single system.

The network redirectors must implement a network protocol 220 used for remote access or provide calls to another system component or service that implements the network protocol or communication mechanism. In an OSI (Open Systems Interconnection) networking model, the network file sharing protocol may be part of the Application/Presentation layer protocol, relying on lower-level protocols for transport. A common method for implementing the network communication is to use a transport driver interface (TDI) to call an existing network protocol stack (TCP/IP, for example). The network protocol stack then communicates at the bottom layer using a Network Driver Interface Specification (NDIS) with the network interface card. For example, the transport layer protocol for SMB may be NetBIOS over TCP/IP, or NBT. The network file sharing protocol may be a client-server implementation that consists of a set of data packets, each packet containing a request sent by the client or a response sent by the server.

Figure 3:
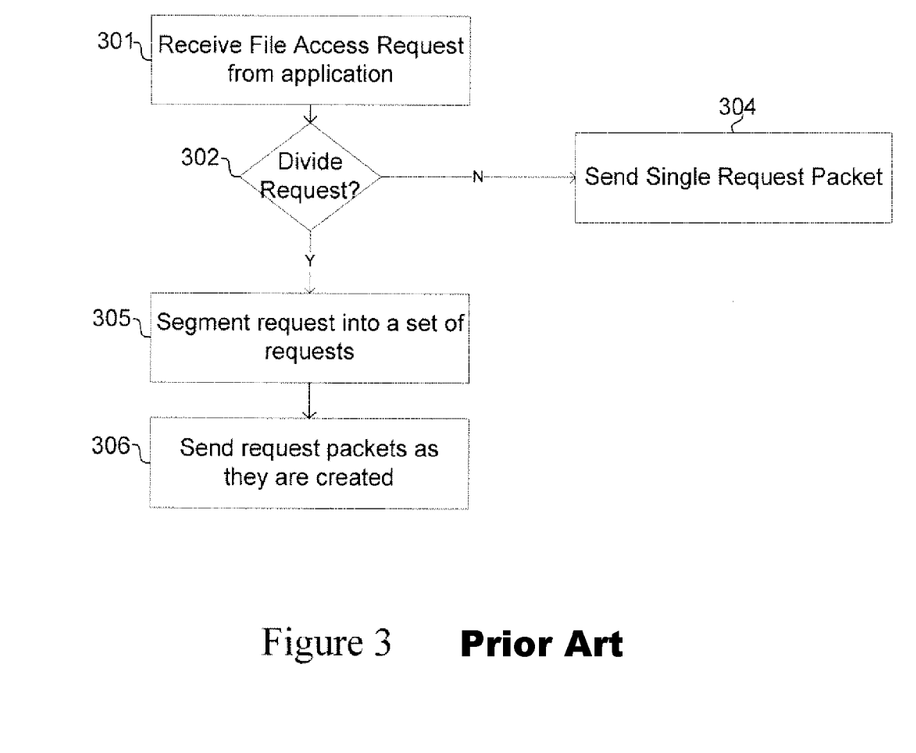
FIG. 3 illustrates an existing client redirector process.

Generally, the client redirector may operate according to the process illustrated in FIG. 3. A client redirector may receive a remote data file request from a client application 301 and determine whether a client request requires one or more packets to be sent to a target file server 302. When the remote file to be read or written to involves an amount of data less than or equal to the size allowed by a transport packet, a single request packet may be created corresponding to the client request 304, otherwise the client request may be divided into a plurality of requests 305. The network packet size may be determined by a number of factors such as the network protocol being used or by the server. For example, in a read request for a 1 MB file, where each packet is only 128 kilobytes (KB) big, eight separate read request packets may need to be sent to retrieve the entire client requested file. The request packets may be sent to the server as they are created 306.

The file data may be divided into file request segments in which each section is about equal to the maximum allowed buffer size (except possibly for the last section containing a remainder data portion). It should be noted that file I/O requests that do not exceed the maximum buffer size (e.g., files under 128 KB) can simply be sent and tracked via a single response message. For a write request, the data may be stored in a payload or buffer section of each network packet. Thus, each packet may carry, for example, 128 KB of data for writing to a file. For each write request packet sent, a return packet may return a confirmation indicating that the data in the payload of a corresponding request packet has been stored. The payload or buffer of the confirmation return packet for a write operation may be empty. For read requests, a set of request packets may be created where each packet commands a read for a particular data portion (e.g., up to the maximum packet size of 128 KB) of a target data file, where the payload is empty. The return packets for the read request from the server will then carry data in its payload corresponding to the read amounts requested in each request packet sent to the server.

Figure 4:
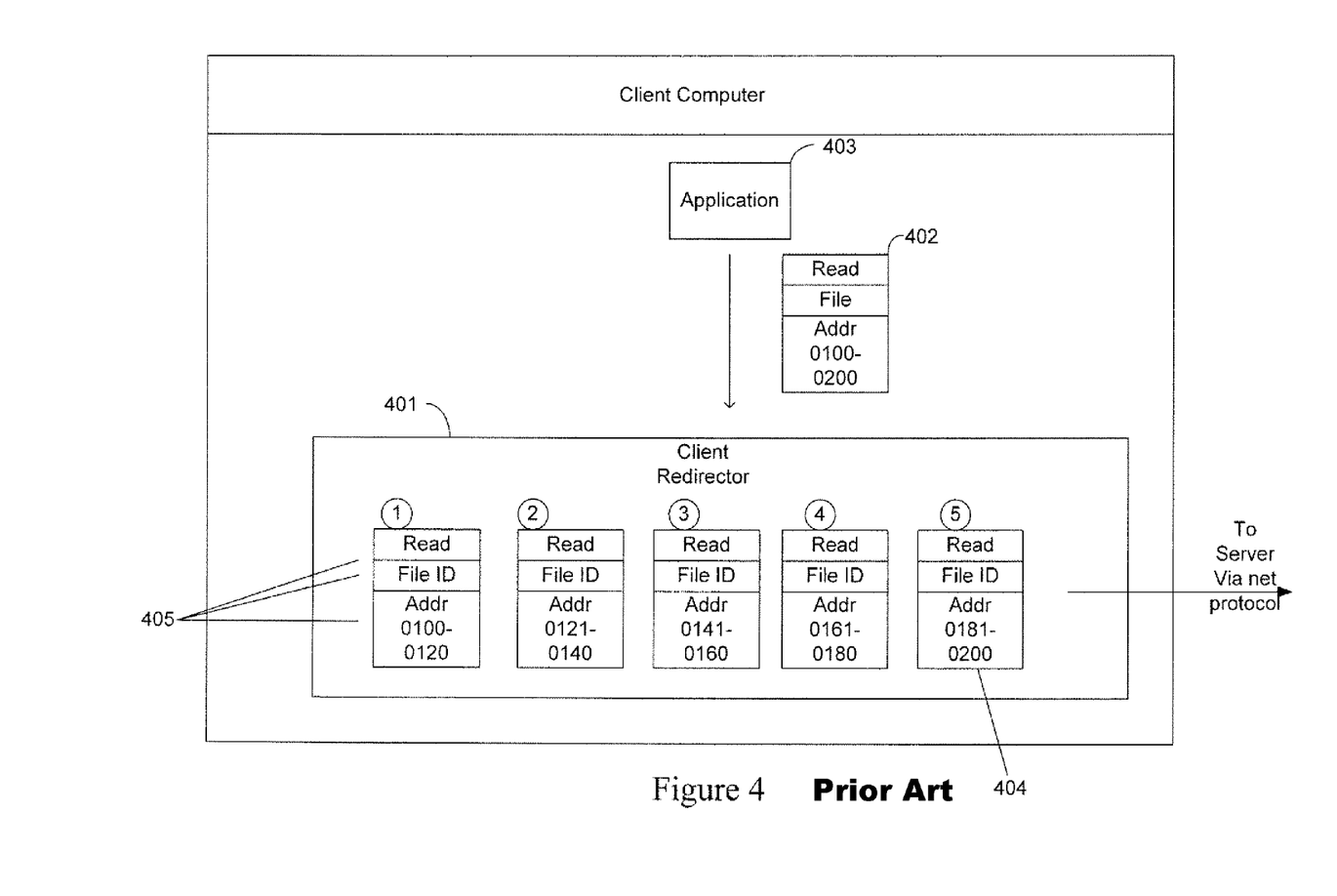
FIG. 4 illustrates a general remote file system I/O request packet sent over a network between a client redirector and a file server.

FIG. 4 illustrates a client redirector 401 receiving a file request 402 from an application 403 that requires five separate read request packets 404 (labeled 1 to 5 in sequential order by contiguous memory access) to be created by the client redirector. The header information 405 for each packet 404 is merely illustrative and does not necessarily provide the complete set of headers that a client redirector request packet 404 may contain. As shown in FIG. 4, the client request 402 indicates a file read command for file data that is 100 data units large. The transport packets 404 in this example are limited to 20 units of data. Thus, five packets 404 are created by the client redirector 401 where each packet contains the address from a 20 unit chunk of data. It should be noted that in some systems, the packets may not be created sequentially and/or the data address ranges may not be the same size. Moreover, the client redirector 401 may not send the requests at the same time or may not send the packets in sequential order (based on, for example, memory read or write).

Figure 5:
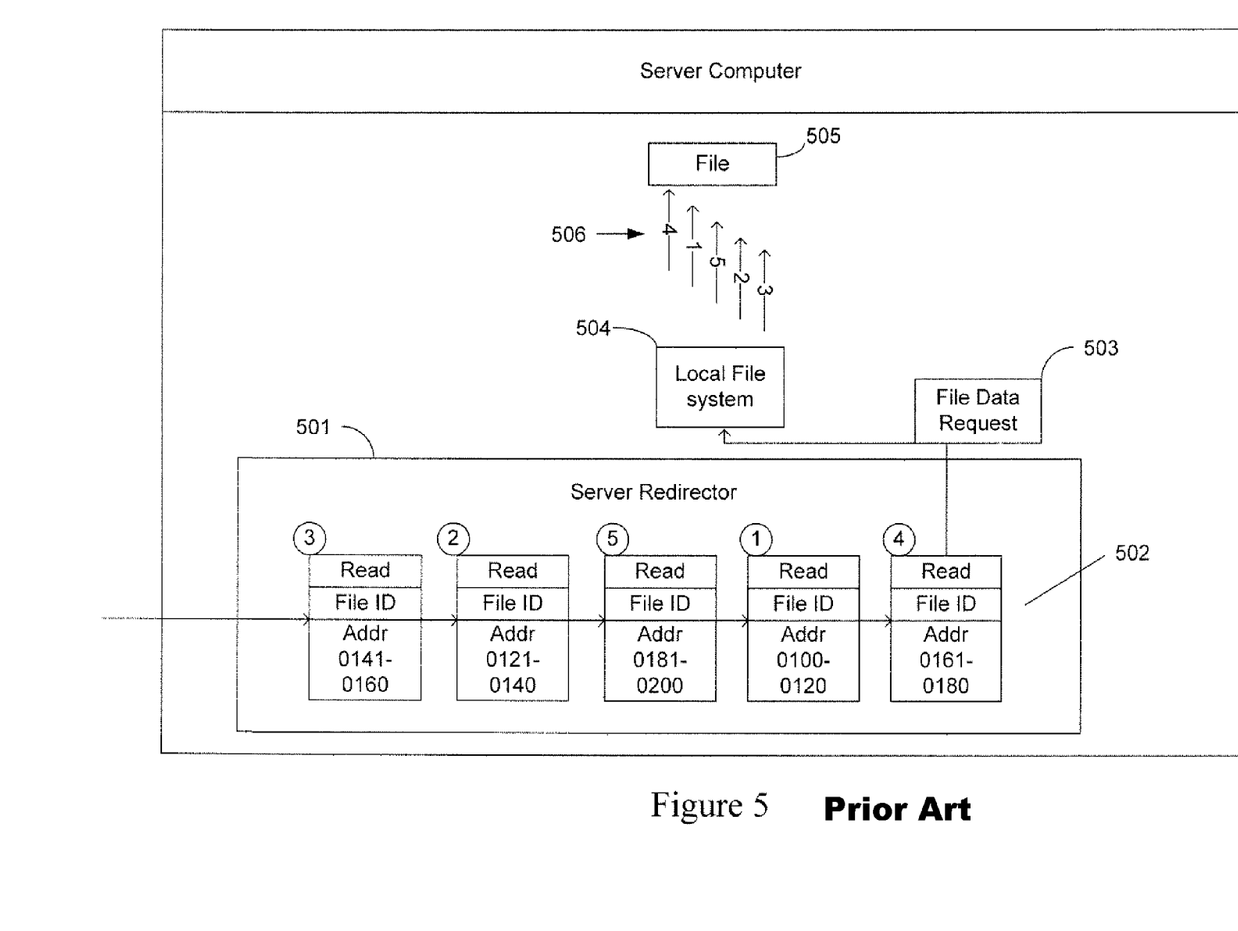
FIG. 5 illustrates the breakdown of the I/O data requests from a server RDR in existing systems.

FIG. 5 illustrates a server redirector 501 receiving the request packets 502 out of order and merely initiating separate file data requests 503 for each request packet 502 to a local file system 504 for retrieving the requested data portion for a file 505. The server redirector 501 may then initiate a file data request 503 to the file system 504 for each packet request 502 as they are received and in the order in which they are received (e.g., when the received packets are queued). Because each packet 502 is received in a random sequence, the file access by the file system 504 may require excessive disk seeks that do not efficiently read the file data being requested by the client application. For example, when the file system 504 reads the same file as five separate disk seeks 506 with non-contiguous segments, a lot of wasted memory pointer movement is entailed. This process is representative of the general operation of existing remote file systems as the order in which the packets are received may be entirely dictated by the existing redirector configuration and network and protocol configurations, as well as network traffic conditions.

Figure 6:
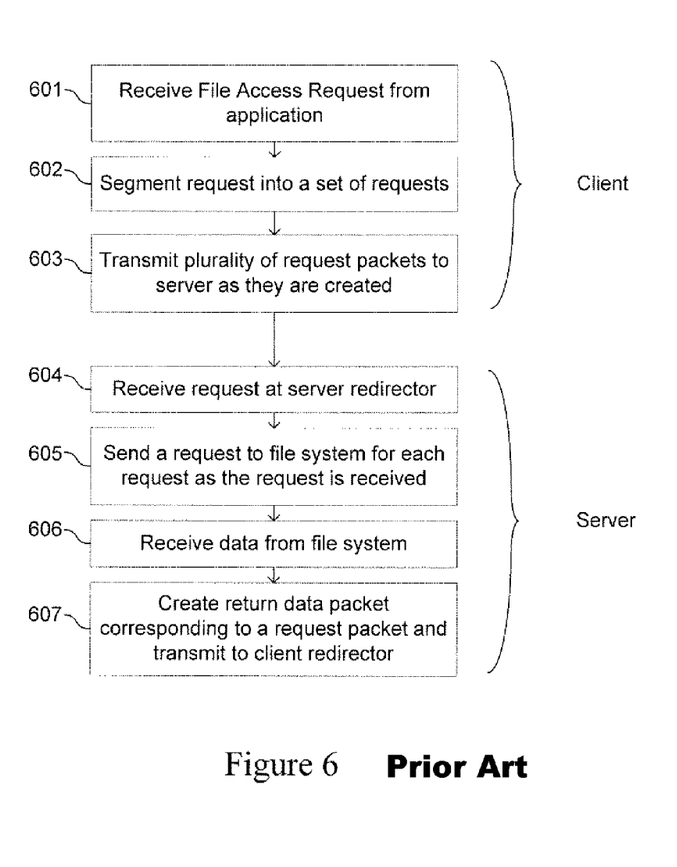
FIG. 6 illustrates a set of received requests at a server in existing remote file systems.

FIG. 6 summarizes an existing process 600 which is implemented in existing remote file systems. Specifically, a client redirector receives a file request (e.g., read or write) for a remote file or memory share 601. The client redirector may segment the file request into appropriately sized data packet requests 602. Depending on the configuration of the client redirector, the file packets may be transmitted or released as the client redirector generates them 603, or buffers them first and releases them based on other factors (e.g., network congestion). A server redirector may receive the packets 604 and begin to send data file requests (a separate request for each packet) to a file system for retrieving data from a file or writing data to a file 605. After the read or write operation is completed 606, the server redirector will then produce return packets carrying the requested information (for a read operation) or provide a confirmation that a data portion has been stored (for a write operation) 607. For each request packet received at the server redirector, there may be a corresponding response packet. In a synchronous protocol, such as SMB, a corresponding response packet may be required to be returned for each request packet. It should be noted that while blocks 601-603 may generally be performed at a client device and blocks 604-607 may generally be performed at a remote server device, some situations may occur when the client redirector is requesting a remote file that may be provided by a server redirector on its own machine.

Figure 7:
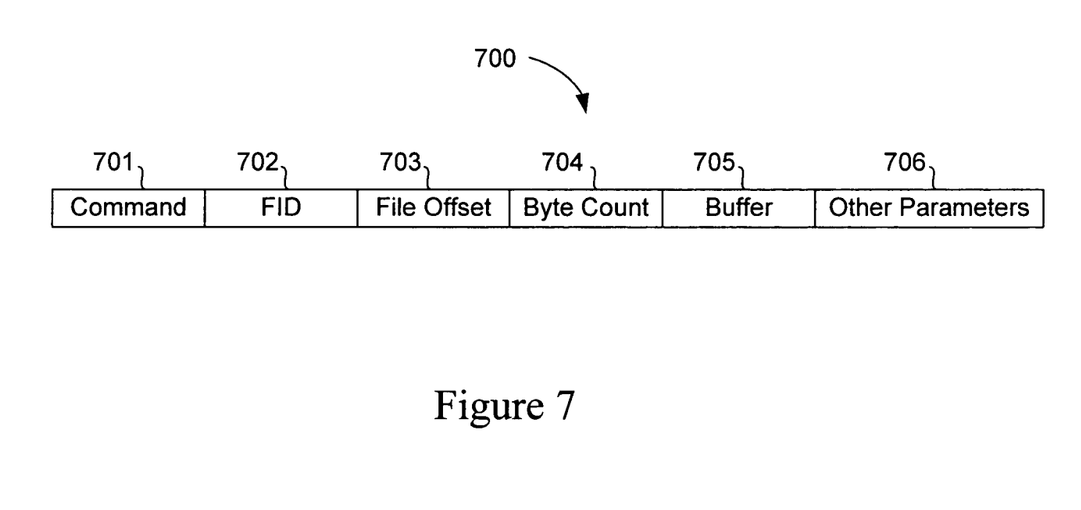
FIG. 7 illustrates a process embodiment of managing input/output requests for a remote file system.

FIG. 7 illustrates general header information that may be contained in a read/write data packet 700 of an existing remote file system. The information includes a command 701, a file identifier (FID) 702, a file offset 703, a byte count 704, a buffer 705, and other parameters 706. The command 701 may indicate, for example, a read or write operation. The FID 702 may provide information for locating a particular file. A file offset 703 may indicate an address offset from an initial zero pointer for determining the location of a file portion (e.g., for reading or writing to based on a packet request). The byte count 704 may indicate the size of the data portion of the packet. The buffer 705 may contain data carrying portion of the packet, which may be used, for example, to carry data for writing to a memory location (e.g., a file) or a confirmation indicator.

Figure 8:
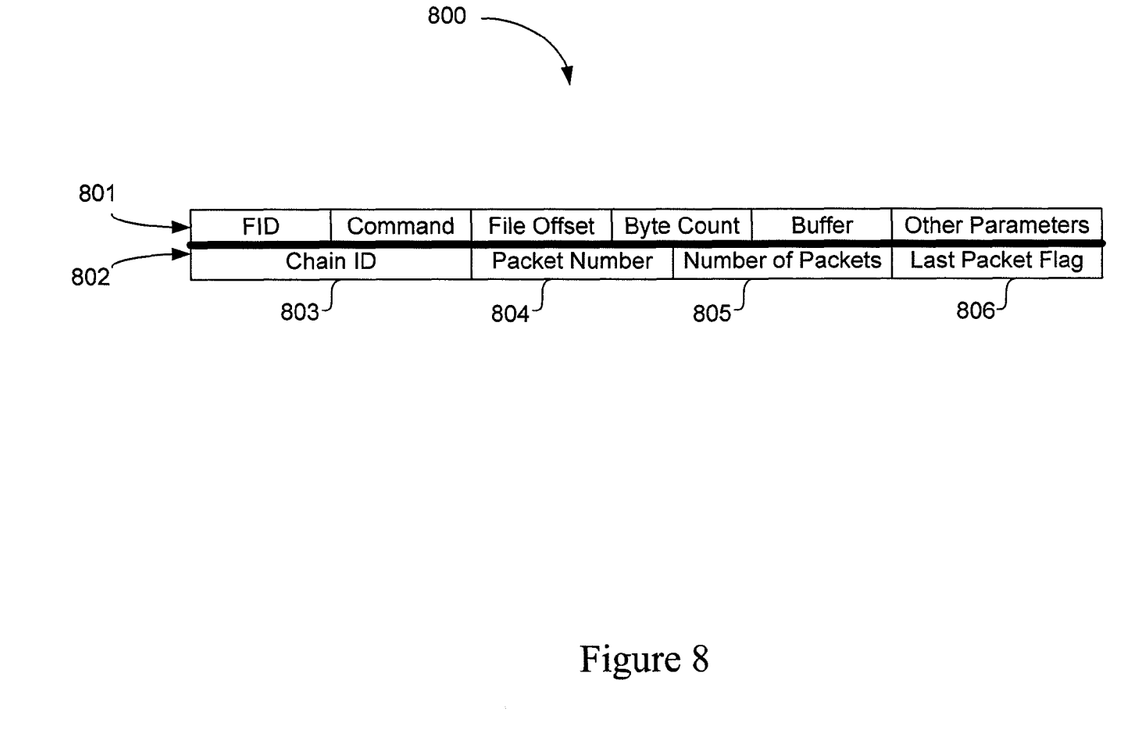
FIG. 8 illustrates a portion of a header that may be used to implement a process embodiment.

FIG. 8 illustrates an embodiment of a packet 800 that may be used with the system and method of the claims. In addition to the headers 801 (shown also in FIG. 7) the header may include a header section which may be called a hint 802. This hint information 802 may be stored in a pre-existing or pre-defined header (without changing the specification of an existing file sharing protocol) or may be defined as a new packet header for a file sharing protocol. The hint may include a chain identifier 803, a packet number 804, the number of packets in the chain 805, and a last packet flag 806. The chain identifier 803 may indicate a particular group of packets comprising a single file request from a client. For example, the chain identifier 803 may identify a group of packets that are created by a client redirector that correspond to a file being requested by a client application. The number of packets 805 may indicate the total number of packets that make up the chain or request. The packet number 804 may indicate the sequence number of the request packet within the group of packets. The sequence may be indicative of a contiguous series of memory addresses for access by the request (read or write). The last packet flag 806 may indicate that a packet is the last packet in the chain or group to be received. The hint may provide information to the server redirector to enable the server redirector to collect or aggregate the entire group of packets for a particular request. The hint may also enable the server redirector to organize the packets based on a sequential access of contiguous memory space.

Figure 9:
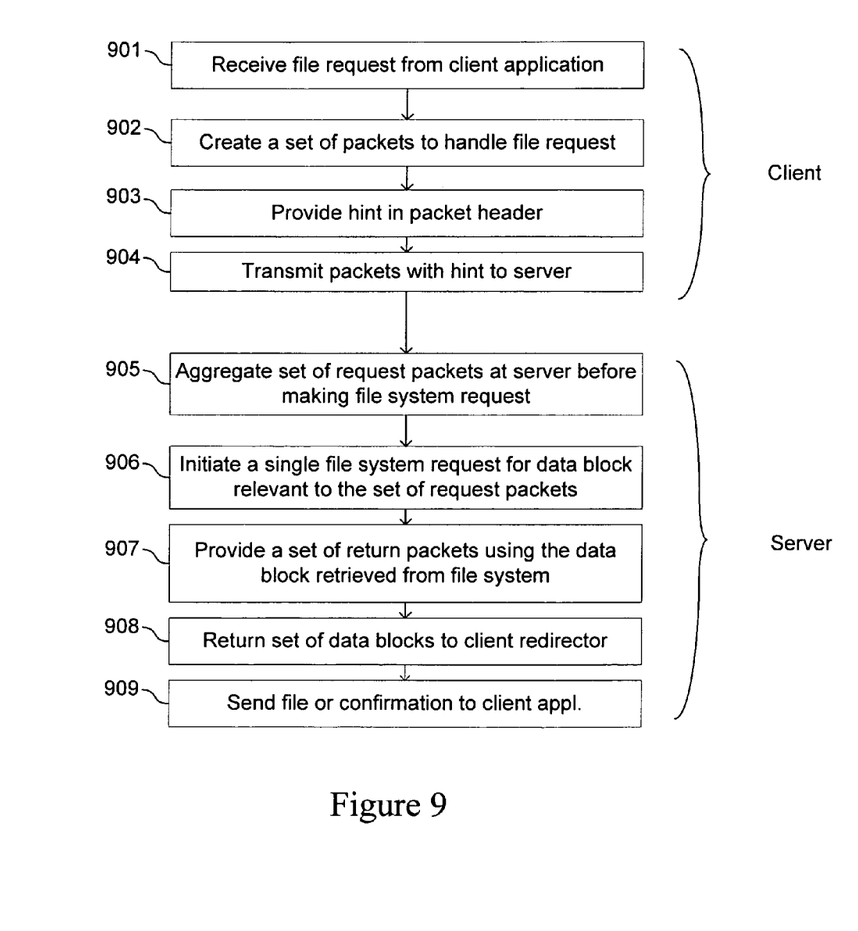
FIG. 9 illustrates an I/O request flow resulting from an embodiment of the claimed system.

FIG. 9 illustrates a process embodiment of the claimed method and system. After receiving a file request from a client application 901, a client redirector may divide the client request into a set of data packet requests for transmission using a communication protocol over a network 902. In this embodiment, additional header information as illustrated in FIG. 8 may be provided 903. The header information may identify the membership of each data packet in a particular set. The set of marked data packets may represent a request for the data required to fulfill the client application file request. The request packets may then be transmitted to the server redirector over the network 904.

The packets may then be received at the server redirector. Instead of sending a separate data request to a file system for a portion of data corresponding to each request packet, the server redirector may aggregate the packets until a minimum or threshold number of packets of the set of packets is received 905. A queue may be used to aggregate the request packets.

For a read request, the header information may be used to identify the complete file data being requested by an entire set of request packets. Thus, each packet may carry information identifying the file and the amount of data (for example all the memory addresses containing all the information for the file request) required to fulfill the entire set of request packets. In one embodiment, upon receiving a first request packet for a set of packets corresponding to a read operation, the server redirector may immediately send a single data request to a file system for the entire data needed to satisfy the set of read request packets that may be eventually received by the server 906. Once the server redirector receives the file data from the file system, the server redirector may then fulfill each request packet of the set of request packets. In one embodiment, this may entail providing a set of corresponding return packets for each read request packet carrying the corresponding data portions for each read request packet 907. These return packets may then be sent back to the client redirector 908. The client redirector may then construct a complete file and return that file to the client application 909.

In one embodiment, more than a single file read request may be sent to a file system. This may be the case when server conditions such as memory pressure, low disk bandwidth, or storage media speed limit data request size. Thus, if the data request size is smaller than the total amount of data needed for a set of read request packets, more than a single file read request may be sent to a file system. In this case a first file request may be sent to a file system for a first portion of the set of request packets and subsequent file requests may be sent for remaining portions.

Memory pressure may indicate that there are many requests for file system access that must be fulfilled in a short amount of time. Thus, waiting too long for a memory write or read may be inefficient. Low disk bandwidth may be a situation in which a particular storage medium is only capable of processing specific sized chunks of data, where the data size is less than an anticipated file size that is to be read or written to. Also, the speed of access of a particular storage medium may be too slow to perform multiple write or read commands.

For a write request, the header information may be used to identify a plurality of received request packets as part of a set of request packets for a write operation. In this case, the server redirector may queue the write request packets until a minimum number of packets has been aggregated or collected and then send a single data request to a file system to write a portion of data corresponding to the data contained in the collected number of write request packets 906. After sending the write request to the file system, the server redirector may provide a set of return packets corresponding to each of the write request packets received 907, where each return packet contains confirmation data that the data in a corresponding write request packet has been written to the file or resource. These return packets may then be sent to the client redirector 908, which in turn returns a confirmation message to the client application 909.

It should be noted that while blocks 901-904 may generally be performed at a client device and blocks 905-909 may generally be performed at a remote server device, some situations may occur when the client redirector is requesting a remote file that may be provided by a server redirector on its own machine.

In one embodiment, the server redirector may queue the entire set of request packets corresponding to a single write file before issuing a single write request that writes the contents of the entire set of collected write request packets to the file system. The last packet indication in the hint header may be used by the server to determine when to check whether the server has received all the packets for a chain, and if so, to stop waiting for additional write packets and write the aggregated data to the file system. In another embodiment, the minimum collection of packets may be determined by one or more factors such as server memory pressure, low disk bandwidth, or storage media speed. Aggregation at the server may also be determined by the time elapsed from receiving the most current write packet for a particular chain. For example, if the server receives a few write packets for a chain and the time lapse before receiving a further write packet for that same chain is greater than a preset threshold, the server may cease to aggregate and just fulfill the existing collection of write requests. The threshold wait time (or time elapsed) may be based on an estimate of the time it will take for a server to receive all write packets.

In another embodiment, the minimum collection of packets may be one. Thus, in this embodiment, there may be no aggregation. It should be noted that the server redirector may be adapted to determine whether aggregation of packets is to be performed and how much aggregation is to be performed (for example, by determining the minimum aggregation).

In one embodiment, the server redirector may queue received packets for a set of write packets into a first queue, order the packets based on packet number (or memory address access sequence) and then send a file system write data request. In this embodiment, a minimum number of contiguous (based on, for example, memory access address) write request packets may first need to be received and ordered before initiating a files system write data request. For example, when a set of request packets consist of five write request packets (identified as contiguous packets 1, 2, 3, 4 and 5), if only packets 1, 3 and 5 are received, the server redirector may await either packet 2 or packet 4 before proceeding with a file system write using the data in a contiguous set of 3 (e.g., either the data from packets 1, 2, and 3 or data from packets 3, 4, and 5).

In one embodiment, the server redirector may queue received packets for a set of write packets into a first queue, order the packets based on packet number (or memory address access sequence) and then, when a minimum number of contiguous write request packets have been received and ordered, transfer the minimum number of contiguous write request packets to a second queue for execution. The second queue may queue multiple file system write requests for more than a single file. Alternatively, the second queue may queue multiple file system write requests from more than a single server redirector.

Figure 10:
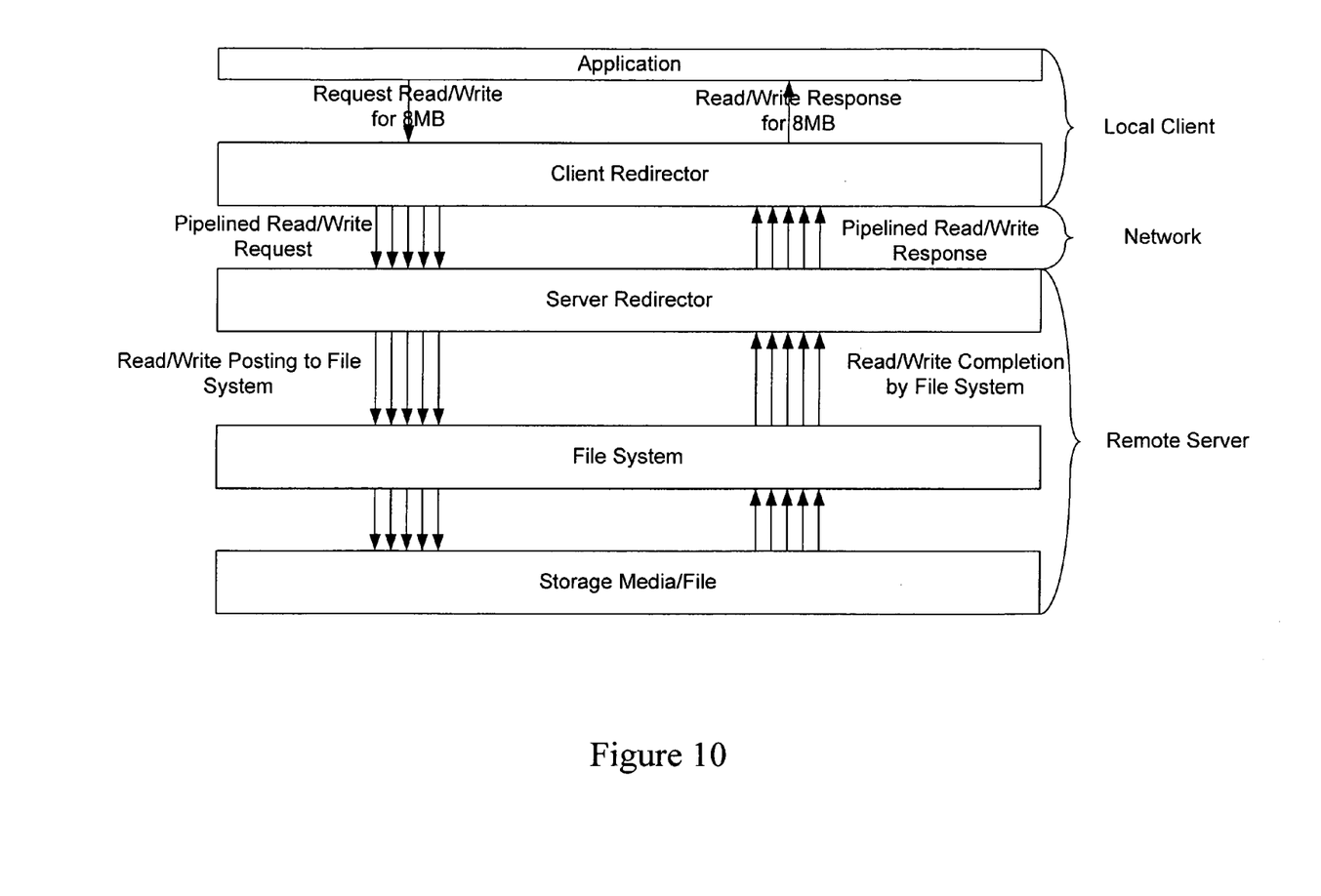
FIG. 10 illustrates the general request flow between components for an existing system.
Figure 11:
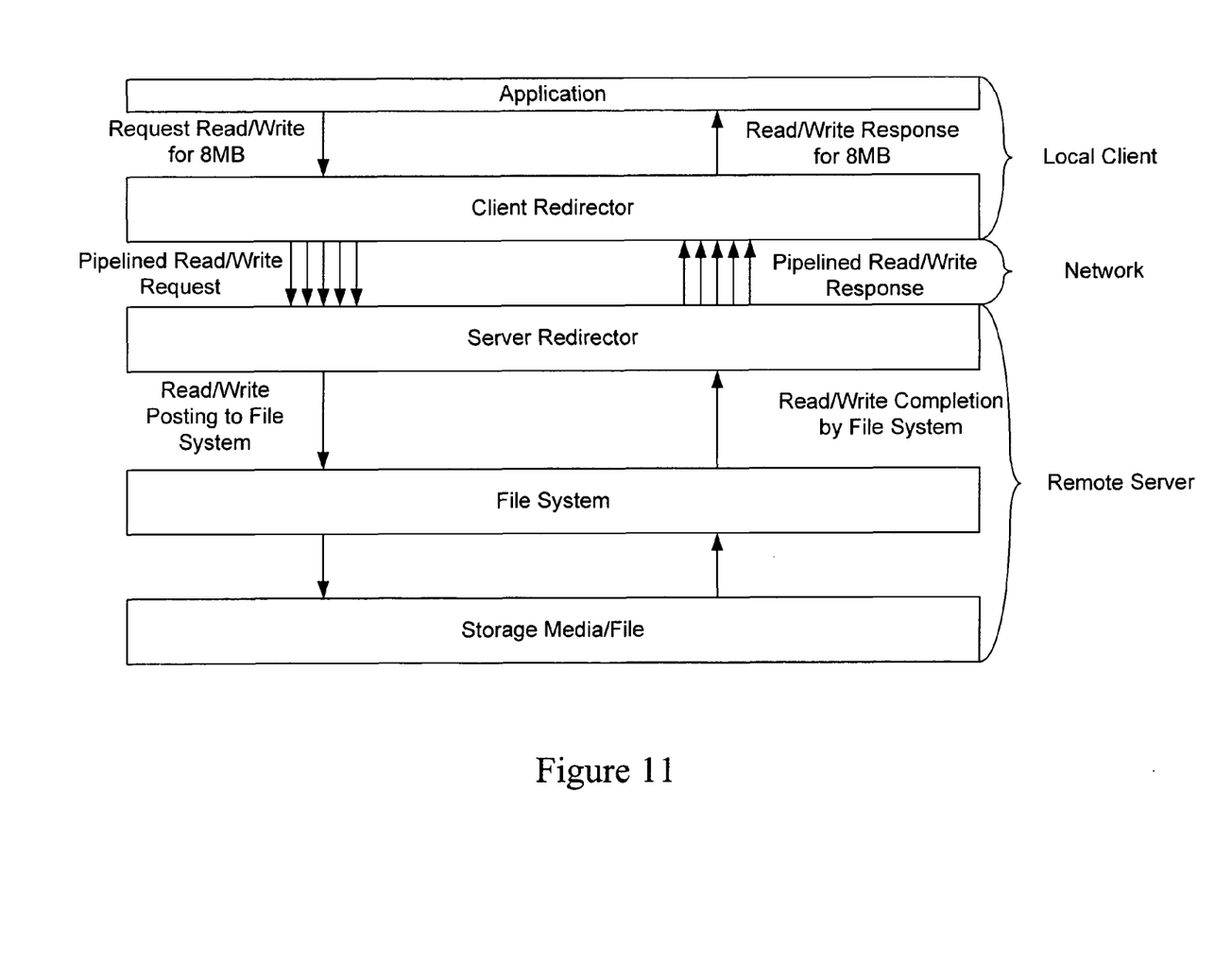
FIG. 11 illustrates a request flow between components in an embodiment of the method and system.

FIG. 10 illustrates an example of message flow between components of existing remote file systems and FIG. 11 illustrates an example of message flow for an embodiment of the claims. A comparison of FIGS. 10 and 11 indicates a reduction in the amount of request traffic between the server redirector and file system/storage media. This reduction in request traffic may dramatically improve data retrieval/write and response time.

Existing remote file systems may not be concerned with aggregation or ordering of request packets because server capacity may be sufficient to handle existing remote access conditions in a particular system. Even if aggregation could be implemented in existing remote file systems based on the existing components, existing systems may still not be enabled to adjust the level of aggregation or ordering based on changing network conditions. It is important to note that in the above described embodiments, the client estimation of work requests (e.g., file request size and tagging/identification of corresponding packets sets) provides the server vital information about upcoming workloads. Thus, even with changing overall network workloads, the server may be able to adjust its aggregation and ordering pattern accordingly to maintain a high level of efficiency. For example, in certain network conditions (e.g., low workload or low volume of requests) aggregation and ordering at the redirector may consume more redirector processing capacity than the processing capacity saved from aggregation at the file system (e.g., the disk manager). In this situation, the redirector may shut off aggregation (based on the estimated load on the server at the time).

The above described embodiments may also effectively distribute work in assessing workload for a remote file system among client and server machines. For example, rather that having a server gauge workload alone, clients may be made responsible for estimating at least their own contribution to upcoming workloads placed on the server. For example, without the hint information, the server may only be able to gauge workload after the server receives a low or high volume of access requests (representing, for example, a memory pressure that is low or high). In this case, it may be less efficient to adjust server aggregation and ordering after the fact (i.e., after the high or low volume workload situation comes into existence). By having the client estimate intended workloads (by producing hint information), the server is able to adjust based on anticipated workloads. Thus, using the hint information generated by the client redirector, a server redirector may further able to effectively and dynamically increase availability and reduce response time in a remote file system.

What is claimed:

1. A method, executed on a processor, for handling file portion requests, comprising:
   receiving, at a computing device, a group of file portion requests from another computing device, the file portion requests from the group of file portion requests individually corresponding to respective portions of a file, wherein:
      individual sizes of the portions of the file requested via the group of file portion requests are less than or equal to a size supported by a transport protocol used for transmitting those file portions,
      the file portions requested via the group of file portion requests correspond to file portions of a contiguous set of at least a threshold quantity of portions of the file,
      a collective size of the portions of the file requested via the group of file portion requests is greater than the size supported by the transport protocol, and
      the file portion requests include sequence numbers associated with a placement of the corresponding file portions within the contiguous set of at least the threshold quantity of portions of the file;
   determining that the computing device has received the group of file portion requests corresponding to a contiguous set of at least a threshold quantity, wherein at least some of the file portion requests of the group were received by the computing device out of a sequential order in which those file portion requests were transmitted from the other computing device;
   in response to the determination, generating an aggregated request for the contiguous set of portions of the file, the aggregated request being generated based, at least in part, on the sequence numbers of the received file portion requests;
   transmitting the aggregated request to a file system accessible from the computing device;
   receiving, from the file system, the contiguous set of portions of the file requested by the aggregated request; and
   transmitting, from the computing device, the received contiguous set of portions of the file to the other computing device.

2. The method of claim 1, wherein transmitting the received contiguous set of portions of the file includes:
   transmitting, to the other computing device, separate responses to each of the file portion requests corresponding to the contiguous set of at least the threshold quantity of portions of the file, each of separate responses including the portion of the file corresponding to that file portion request.

3. The method of claim 1, wherein the file system is a component of the computing device.

4. The method of claim 1, wherein transmitting the received contiguous set of portions of the file includes:
   responding to each file portion request corresponding to the contiguous set of at least the threshold quantity of portions of the file using data received in response to the aggregated request.

5. The method of claim 1, wherein generating the aggregated request includes:
   storing the received file portion requests in a first queue.

6. The method of claim 4, wherein the data received in response to the aggregated request is stored in a first read queue for a period of time and is used to fulfill file portion requests received, during the period of time, for the queued data.

7. The method of claim 1, wherein at least one the file portion request includes an indication of a total number of file portion requests that, together, represent the file.

8. The method of claim 7, further wherein the at least one file portion request also includes a number sequence for that file portion requests.

9. The method of claim 1, wherein the at least one file portion request also includes an indication of whether that file portion request is a last file portion request of the total number of file portion requests.

10. A computer-storage device having stored therein computer-executable instructions for causing a computing device to perform operations comprising:
   receiving plurality of file portion requests from a remote computing device, wherein:
      each file portion request of the plurality of file portion requests is associated with a different portion of a file,
      individual sizes of the portions of the file requested via the group of file portion requests are less than or equal to a size supported by a transport protocol used for transmitting those file portions,
      the file portions requested via the group of file portion requests correspond to file portions of a contiguous set of the file,
      a collective size of the portions of the file requested via the group of file portion requests is greater than the size supported by the transport protocol, and
      the file portion requests include sequence numbers associated with a placement of the corresponding file portions within the contiguous set of at least the threshold quantity of portions of the file;
   aggregating multiple file portion requests into an aggregated request for the different portions requested by each of the multiple file portion requests based, at least in part, on the sequence numbers of each of the multiple file portion requests, at least some of the multiple file portion requests are received by the computing device out of a sequence order in which those file portion requests were transmitted from the remote computing device;
   transmitting the aggregated request to a file system;
   receiving an aggregated response to the aggregated request from the file system; and
   transmitting a plurality of file portion responses to the remote computing device, wherein each file portion response of the plurality of file portion responses is based on a portion of the aggregated response associated with a corresponding file portion request of the multiple file portion requests.

11. The computer-storage device of claim 10, wherein the file portion requests are requests to read the associated different portions of the file, and wherein transmitting the plurality of file portion responses includes:
   transmitting at least two portions of the file received from the file system to the remote computing device.

12. The computer-storage device of claim 10, wherein the file portion requests are requests to write data to the associated different portions of the file, and wherein the aggregated request includes the data that is to be written to the associated different portions of the file.

13. The computer-storage device of claim 12, wherein aggregating the multiple file portion requests includes:
   ordering the data of the file portion requests according to a sequence indicated by the file portion requests.

14. The computer-storage device of claim 10, wherein the file portion requests include indications that the multiple file portion requests correspond to the file, indications of a quantity of file portion requests in the multiple file portions requests, indications of a sequence for the multiple file portion requests, and indications of whether each of the file portion requests is a last file portion request of the multiple file portion requests.

15. The computer-storage device of claim 10, wherein a quantity of file portion requests in the aggregated multiple portion requests is based on load or capability of the computing device.

16. A computing device, comprising:
   a memory and a processor that are respectively configured to store and execute instructions, including instructions for performing operations to respond to file portion requests from another computing device, the operations including:
      receiving a group of file portion requests from the other computing device, the file portion requests from the group of file portion requests individually corresponding to respective portions of a file, wherein:
         individual sizes of the portions of the file requested via the group of file portion requests are less than or equal to a size supported by a transport protocol used for transmitting those file portions,
         the file portions requested via the group of file portion requests correspond to file portions of a contiguous set of at least a threshold quantity of portions of the file,
         a collective size of the portions of the file requested via the group of file portion requests is greater than the size supported by the transport protocol, and
         the file portion requests include sequence numbers associated with a placement of the corresponding file portions within the contiguous set of at least the threshold quantity of portions of the file;
      determining that the computing device has received the group of file portion requests, wherein at least some of the file portion requests of the group were received by the computing device out of a sequential order in which those file portion requests were transmitted from the other computing device;
      in response to the determination, generating an aggregated request for the contiguous set of portions of the file, the aggregated request being generated based, at least in part, on the sequence numbers of the received file portion requests; transmitting the aggregated request to a file system accessible from the computing device;
      receiving, from the file system, the contiguous set of portions of the file requested by the aggregated request; and
      transmitting, from the computing device, the received contiguous set of portions of the file to the other computing device.

17. The computing device of claim 16, wherein transmitting the received contiguous set of portions of the file includes:
   transmitting, to the other computing device, separate responses to each of the file portion requests corresponding to the contiguous set of at least the threshold quantity of portions of the file, each of separate responses including the portion of the file corresponding to that file portion request.

18. The computing device of claim 16, wherein transmitting the received contiguous set of portions of the file includes:
   responding to each file portion request corresponding to the contiguous set of at least the threshold quantity of portions of the file using data received in response to the aggregated request.

19. The computing device of claim 16, wherein at least one the file portion request includes an indication of a total number of file portion requests that, together, represent the file.

20. The computing device of claim 16, wherein the at least one file portion request also includes an indication of whether that file portion request is a last file portion request of the total number of file portion requests.

* * * * *